United States Patent [19]
Hoekje et al.

[11] 3,982,960
[45] Sept. 28, 1976

[54] SECONDARY ELECTROCHEMICAL CELL HAVING NON-CONSUMABLE SILICON CATHODE

[75] Inventors: Howard H. Hoekje; Paul L. Dietz, both of Akron, Ohio

[73] Assignee: PPG Industries, Inc., Pittsburgh, Pa.

[22] Filed: Mar. 31, 1975

[21] Appl. No.: 563,939

Related U.S. Application Data

[63] Continuation-in-part of Ser. No. 398,746, Sept. 19, 1973, abandoned.

[52] U.S. Cl............................... 429/199; 429/218; 429/229
[51] Int. Cl.².......................................... H01M 4/38
[58] Field of Search ................ 136/20, 30, 120, 83, 136/100, 6 R, 25

[56] References Cited
UNITED STATES PATENTS

| | | | |
|---|---|---|---|
| 3,078,327 | 2/1963 | Lieb | 136/83 R |
| 3,375,135 | 3/1968 | Moulton et al. | 136/6 SA |
| 3,400,019 | 9/1968 | Le Duc | 136/120 FC |
| 3,542,596 | 11/1970 | Arrance | 136/146 |
| 3,738,870 | 6/1973 | De Rossi | 136/30 X |

*Primary Examiner*—John H. Mack
*Assistant Examiner*—C. F. LeFevour
*Attorney, Agent, or Firm*—Richard M. Goldman

[57] ABSTRACT

Disclosed is a secondary cell for the generation of electrical power, having a non-consumable, silicon cathode collector.

11 Claims, 2 Drawing Figures

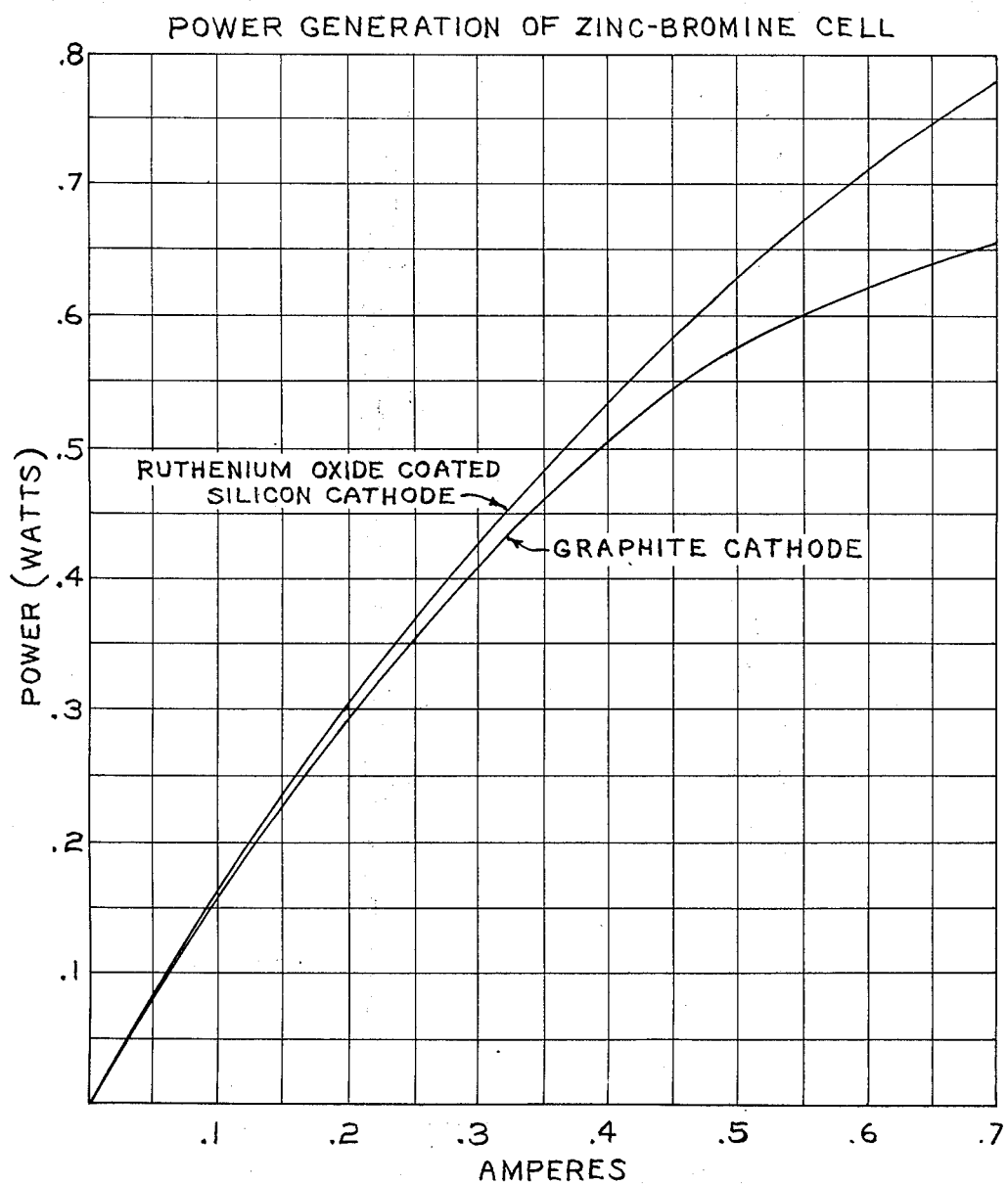

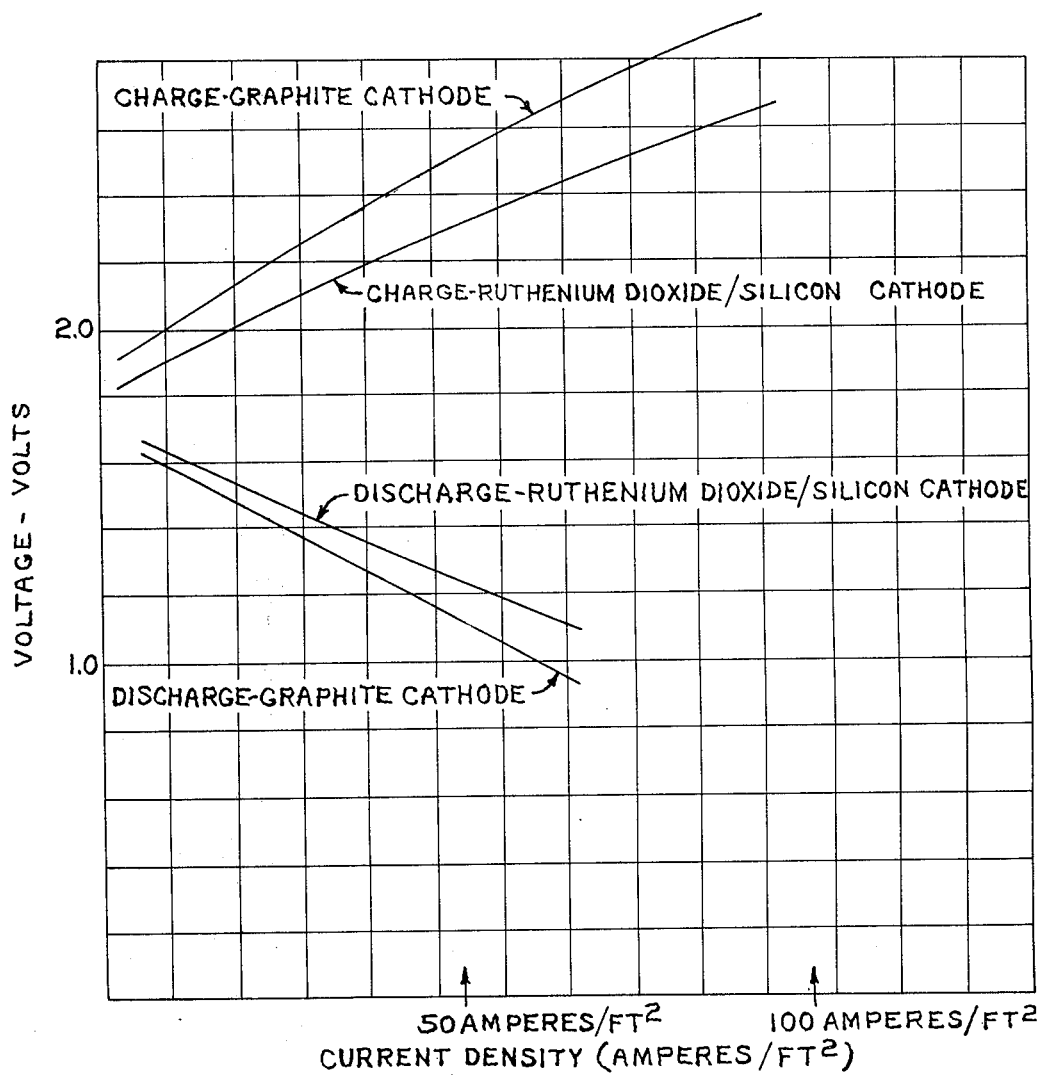

SECONDARY ELECTROCHEMICAL CELL HAVING NON-CONSUMABLE SILICON CATHODE

CROSS REFERENCE TO RELATED APPLICATION

This is a continuation-in-part of commonly assigned, co-pending U.S. application Ser. No. 398,746, filed Sept. 19, 1973 now abandoned.

BACKGROUND OF THE INVENTION

Reversible electrochemical cells, i.e., secondary cells, storage batteries, and accumulators, are characterized in that the chemical relationships of the electrodes and the electrolyte may be restored to a condition of substantially full charge by causing current to flow into the cell. Exemplary of such cells are lead acid cells, nickel-iron-caustic soda cells, and nickel cadmium cells.

One class of secondary cells are cells having zinc halogen electrolytes. Zinc halogen cells are described, for example, in the article by Heise, Schumacher and Cahoon, *A Heavy Duty Chlorine-Depolarized Cell*, Journal of the Electrochemical Society, August, 1948, page 99, and in the article by Barnartt and Forejt, *Bromine-Zinc Secondary Cells*, Journal of the Electrochemical Society, Nov. 1964, page 1201. While zinc-halogen secondary cells have a high theoretical energy density and are capable of delivering high current at sustained voltages, they suffer from low voltage efficiency, i.e., a low value of the quotient of voltage during discharge divided by the average voltage during the corresponding charge.

SUMMARY OF THE INVENTION

It has now been found that a particularly outstanding electrochemical cell, i.e., one characterized by high voltage efficiency, ampere hour efficiency, watt hour efficiency, and energy density may be provided by a secondary cell, a cathode collector with a silicon substrate, and a suitable electroconductive surface thereon. Additionally, the cell may have an anode collector with a silicon substrate and a coating capable of partaking in the current generating reaction.

DESCRIPTION OF THE INVENTION

According to this invention, a secondary electrochemical cell is provided having a consumable anode collector, a non-consumable cathode collector, an electrolyte, and provisions for recovering the electrical current generated in the cell. The cathode collector has a silicon substrate with a suitable electroconductive surface on the substrate. According to a further exemplification of this invention, the consumable anode collector, capable of partaking in the electrochemical generation of energy, is provided by a coated silicon substrate.

According to this invention, a reversible electrochemical cell for the electrochemical generation of energy is provided. Reversible electrochemical cells are also known as secondary cells, storage batteries, and accumulators. The electrode-electrolyte system of the electrochemical cell of this invention is one wherein the cathode collector is not a reactant in the reaction; and the reaction is reversible.

As used herein, the positive pole of a cell is a cell from which current flows into the external circuit. The positive electrode is the plate which is connected to the positive pole, while the negative electrode is the one which is connected to the negative pole.

Secondary cells may be rated in terms of the ampere-hour efficiency which is the economic ampere hours output of the cell during discharge divided by the ampere hours input to restore the cell to its original charged state. Another method of rating cell efficiency is volt efficiency, which is the average voltage during discharge, divided by the average voltage during the corresponding charge as will be described more fully hereinafter. A further method of rating cell efficiency is the watt hour efficiency which is the ampere hour efficiency multiplied by the voltage efficiency. Two additional indicia of cell efficiency, both of which are particularly sensitive to cell design and structure, are the capacity, which is the amperes times time divided by the weight of the cell and the energy density which is the watt hours obtainable from the cell divided by the weight of the cell.

In a zinc bromide electrochemical cell prepared according to this invention, it has been found that the discharge voltage is from about 0.02 to about 0.20 volts higher than is the discharge voltage of a control cell having a graphite cathode collector, and the charging voltage was from about 0.1 to about 0.30 volts lower, at the same current densities, electrode gap, normality, and electrolyte temperature as a cell having a graphite cathode collector. Under substantially similar conditions, a zinc bromide secondary cell having a ruthenium dioxide coated silicon cathode appears to have a voltage efficiency approximately 17 percent better than the voltage efficiency of a zinc bromide electrochemical cell having a graphite cathode.

In providing a reversible or secondary electrochemical cell, the electrolyte should have the property of reversibility. That is, it should sustain the reverse chemical reaction with the products of the discharge reaction not being lost as gases or separate phases. The electrolyte should have good electrical conductivity. The specific electrical conductivity should be in excess of about 0.05 $(ohm-cm)^{-1}$ and preferably in excess of about 0.10 $(ohm-cm)^{-1}$. Additionally, the electrolyte should not attack either the electrodes or the separator, if any. The cathode reaction on discharge should not require the consumption of the cathode collector. That is, the cathode collector itself should not be a reactant in either the power generating or the recharging reaction. Preferably, the electrolyte should be a liquid or fused salt electrolyte which exhibits the above-described properties. For low temperature service, e.g., below about 100°C., the electrolyte should be an aqueous electrolyte and preferably an acidic aqueous electrolyte. Such electrolytes are described in R. Jasinski, *High Energy Batteries*, Plenum Press, New York (New York), 1967.

Particularly desirable electrolyte systems having the above properties include the oxyhalate systems, the zinc halide systems, and the peroxide systems.

A preferred electrolyte system is the zinc halide system, i.e., a system where the electrolyte is aqueous zinc chloride, zinc bromide, or zinc iodide. The theoretical reaction energy of zinc chloride is about 2.1 volts. The theoretical reaction energy of zinc bromide is about 1.8 volts. The theoretical reaction energy of zinc iodide is about 1.2 volts. The theoretical reaction energy of zinc fluoride, useful in a non-aqueous solvent, is about 3.5 volts.

Fluorine, when present in an aqueous media, may react with the water to form, among other reaction products, hydrogen fluoride, ozone, and hydrogen peroxide. Iodine, under the conditions encountered during normal power generation conditions in secondary cells, is a solid. Accordingly, the preferred electrolytes are zinc chloride and zinc bromide. Chlorine and bromine are preferred in a zinc halide cell because of their chemical reactivity and physical form which make them amenable to an aqueous electrolyte electrochemical cell process.

Zinc bromide is particularly preferred because it forms compounds with water that are safer to handle than the analogous compounds of chlorine. Additionally, bromine is a liquid at standard conditions of temperature and pressure, thereby eliminating the need for pressure vessels for the storage of a compressed liquid halogen. A further advantage of bromine is that bromine is soluble in water forming hydrates, tribromine ions, pentabromine ions, and molecular bromine in water.

According to one exemplification of this invention, the bromine may be distributed between the electrolyte and an electrolyte insoluble phase. Preferably, the electrolyte insoluble phase will have a different density than the electrolyte so as to be vertically separated therefrom. Thus the electrolyte insoluble phase will either be less dense or more dense than the electrolyte, but not as dense as the electrolyte. The bromine should have a higher solubility in the electrolyte insoluble phase than in the electrolyte, whereby the electrolyte insoluble phase acts as a source of bromine during discharge and a bromine sink during recharge. Materials useful in providing the electrolyte insoluble phase include liquid halogenated hydrocarbons such as chloroform, bromoform, iodoform, carbon tetrachloride, carbon tetrabromide, perchloroethylene, perbromoethylene, and the like. Alternatively, carbon disulfide may be used as the electrolyte insoluble phase.

However, chlorine may be used in the electrochemical cell of this invention, and may be fed into the cell from a compressed gas cylinder or from a liquified gas cylinder or from any other suitable means of providing elemental chlorine thereto.

The cell reactions during discharge are:

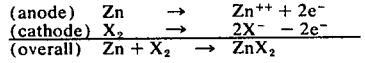

The reverse reactions on charge are:

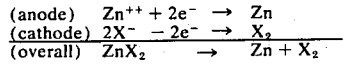

X as used in the above reactions represents a halogen.

The anode collector of a zinc halide electrochemical cell of this invention may either be graphite with a zinc coating thereon, silicon with a zinc coating thereon, or a zinc member such as a zinc sheet, plate, or film.

According to this invention, the cathode collector is silicon with a coating or layer of an electroconductive, electrolyte resistant material suitable for the service herein contemplated.

Another group of ambient temperature systems useful with the cathode collector of this invention are those having an alkali metal anode collector, as a lithium anode collector and an alkali metal halide salt electrolyte, as a lithium salt electrolyte, dissolved in a suitable liquid oxyhalide solvent. An exemplary salt is LiAlCl$_4$. Other alkali metals as potassium and sodium may also be used. Exemplary liquid oxyhalide solvents include the liquid oxyhalides of phosphorous and sulfur, such as POCl$_3$, SO$_2$Cl$_2$, and SOCl$_2$. In phosphorous oxychloride solutions, the overall cell reaction on discharge is reported to be:

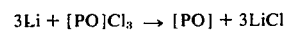

A particularly satisfactory cathode collector for the lithium salt/oxyhalide system is prepared from powdered silicon and a powdered halocarbon dispersion pressed onto a suitable carrier. Such a cathode collector may be prepared by mixing powdered silicon with 20 weight percent of DuPont TFE dispersion No. 30 and sufficient water to make a paste. The paste may then be applied to a nickel screen, pressed between steel at an elevated pressure, e.g., 10,000 pounds per square inch, and dried under vacuum. Alternatively, monolithic silicon could be used, either with or without a surface coating thereon.

Alternatively, chlorine or bromine could be provided in solution in a battery having a lithium anode collector, an oxyhalide electrolyte solution as described above, and a silicon cathode collector.

In still another exemplification of this invention, the anode collector of this invention may be used in combination with an active metal anode collector such as aluminum, tin, iron, magnesium, or the like.

According to this invention, the cathode collector is provided by a silicon base having a suitable electroconductive surface thereon suitable as a reaction site for both the discharge and charge reactions. The silicon useful in providing the electrode substrate of this invention has an electroconductivity of greater than about 100 (ohm-cm)$^{-1}$ and preferably in excess of 1,000 (ohm-cm)$^{-1}$ as will be described more fully hereinafter.

The material on the surface of the silicon cathode collector may be either an electrocatalyst, or an electroconductive material, or an electroconductive material having electrocatalytic properties. As used herein an electrocatalyst or material with electrocatalytic properties is a material which may participate in the process of the absorption of the molecular halogen on the electrode, or in the disassociation of the molecular halogen to form mono-atomic neutral halogen atoms, or in the electron transfer from the electrode to the mono-atomic halogen atoms to form negatively charged halide ions, or in the desorption of the negatively charged halide ions into the electrolyte. Electrocatalytic properties, as the term is used herein, are evidenced by either increased voltage upon discharge, or decreased voltage during charge, or both.

Particularly satisfactory materials having electrocatalytic properties as the term is used herein, and useful in providing the surface layer, film, or coating upon the cathode, include the platinum group metals, ruthenium, rhodium, palladium, osmium, iridium, and platinum. Particularly outstanding is an alloy of about 10 to 20 weight percent iridium, balance platinum. Additionally, the oxides thereof such as ruthenium dioxide, rhodium trioxide, palladium dioxide, osmium dioxide, iridium trioxide, and platinum dioxide may be used. Particularly outstanding is a crystalline combination of platinum dioxide and palladium dioxide. Especially outstanding is a coating of ruthenium dioxide and titanium dioxide. Alternatively, other oxygen-containing compounds of the platinum group metals such as the delafossites palladium cobalt oxide and platinum cobalt oxide and the like may be used. The pyrochlores such as bismuth ruthenium oxide and bismuth rhodium oxide, and the like may also be used with satisfactory results. The perovskites as the alkaline earth and rare earth ruthenates, ruthenites, rhodates, and rhodites may also be used to provide the surface on the silicon cathode collectors of this invention. Alternatively, the oxides or oxygen-containing compounds of the platinum group metals or the platinum group metals themselves may be admixed with or present with nonconductive metal oxides such as titanium dioxide, the various oxides of tungsten, oxides of zirconium, the oxides of hafnium, the oxides of vanadium, the oxides of columbium, the oxides of molybdenum, the oxides of chromium, and the like. Alternatively, the material on the surface of the silicon cathode collector may be a surface catalyst such as magnetite, or a spinel such as cobalt aluminate, nickel aluminate, iron aluminate, iron chromate, cobalt chromate, or the like.

A particularly outstanding surface coating material for silicon cathode collectors utilized as described herein is a combination of ruthenium dioxide and titanium dioxide codeposited so as to be of substantially uniform composition. Preferably, such coating is from about 20 to about 80 weight percent of the ruthenium dioxide and from about 80 to about 20 weight percent of the titanium dioxide.

While a surface layer upon the cathode collector has been spoken of, it is to be understood that the material providing the surface layer need only be a small fraction of the total exposed surface of the silicon, for example, 20 percent or less even as low as 10 percent or 5 percent or less of the total surface of the silicon. The film or layer of the electroconductive material need not be particularly thick, for example, a coating thickness on the order of 5 micro inches or 10 micro inches or more is sufficient for the purposes herein contemplated.

The silicon useful in providing the electrodes of the electrochemical cell of this invention is characterized by its substantial inertness in the electrolytes useful in the electrochemical cell of this invention and further by an electroconductivity in excess of about 100 (ohm-cm)$^{-1}$, and preferably in excess of about 1,000 (ohm-cm)$^{-1}$. Such silicon is generally provided by an alloy containing sufficient dopant to provide the necessary electroconductivity. The dopant may be nitrogen, phosphorous, aluminum, or boron. Most commonly, boron or phosphorous is the dopant. Boron is the preferred dopant. The amount of dopant is sufficient to provide an electroconductivity greater than 100 (ohm-cm)$^{-1}$. This is on the order of about 0.2 weight percent dopant or higher, elemental basis. As a practical matter, the concentration of the dopant will be equal to or greater than the solubility of the dopant in molten silicon. This solubility limit is on the order of about 0.5 weight percent dopant, elemental basis. Concentration of the dopant should, however, not be such as to increase the susceptibility of the silicon substrate to corrosion or spalling. That is, the concentration of the dopant should be maintained below about 2.0 weight percent, elemental basis.

The silicon contemplated herein may be an alloy consisting essentially of silicon and dopant. However, most likely the silicon electrode will be cast silicon and will therefore include a silicide of a transition metal in order to provide castability. The silicide of the transition metal is present in order to provide favorable mechanical properties to the cast alloy. Typical metals useful in providing the transition metal silicide present in the silicon electrode of the secondary cell of this invention include titanium, zirconium, hafnium, vanadium, columbium, tantolium, chromium, molybdenum, tungsten, manganese, iron, cobalt, nickel, copper, ruthenium, rhodium, palladium, osmium, iridium, platinum, gold, and silver. Most commonly, the transition metal present as the silicide in the silicon alloy will be a silicide of manganese, chromium, iron, cobalt, nickel, or molybdenum. The amount of the silicide will be sufficient to provide satisfactory castability but not great enough to deleteriously effect the properties of the silicon, i.e., from about 2 percent or more up to as high as 30 percent transition metal, elemental basis. Particularly desirable alloys, having a predominant silicon rich phase, wherein the silicide is present at or below the solubility limit of the silicide in silicon, continuous rivulets of a continuous silicide rich phase wherein the silicon is present therein at or below the solubility limit of silicon in the silicide surrounding the silicon rich phase, and discrete nodules of a dopant rich phase, are described in the commonly assigned copending application of Howard H. Hoekje for "Electroconductive Corrosion Resistant High Silicon Alloys", filed Aug. 27, 1973, Ser. No. 391,118.

Interposed between the anode and the cathode of the electrochemical cell of this invention may be a diaphragm or divider. While such a diaphragm or divider is not necessarily required for all of the electrolytic/collector systems herein contemplated, higher voltage efficiency and watt hour efficiency may be obtained if such a diaphragm or divider is present. When present, the diaphragm or divider may either be a barrier between the anode and the cathode permitting the flow of electrolyte therebetween, or the divider may be a carrier substantially immobilizing the electrolyte between the anode and cathode but permeable to the flow of ions. Where the divider is a barrier between the anode and cathode it may be a permionic membrane, permitting the flow of ions but substantially impermeable to the bulk flow of electrolyte. Such permionic membranes may, when used, be provided by fluorinated ion exchange membranes such as DuPont "NAFION" (TM) perfluorinated, sulfonated hydrocarbons. Alternatively, the barrier may be provided by perfluorinated, sulfonated, styrene as described in U.S. Pat. No. 3,341,366 to R. B. Hodgden et al for "Sulfonated Polymers of Alpha, Beta-Trifluorostyrene, With Applications to Structures and Cells". Alternatively, other permionic or microporous barriers or dividers may be used between the anode and the cathode of the cell.

Alternatively, the barrier may be an electrolyte permeable gas permeable diaphragm. When an electrolyte permeable, gas permeable diaphragm is interposed between the anode and the cathode, the diaphragm may be fabricated out of materials well-known in the electrochemical cell art.

The secondary cell herein contemplated may be a monopolar cell having a coated silicon cathode collector and a suitable anode collector. Alternatively, the secondary cell herein contemplated may be a bipolar battery with a plurality of individual bipolar electrodes, electrically and mechanically in series. Each individual bipolar electrode may be a silicon member, e.g., a sheet or plate, with a cathodic surface on side, e.g., a ruthenium dioxide-titanium dioxide coating, and an anodic surface on the opposite side.

In the operation of the electrochemical cell according to this invention, an electrical load, i.e., a resistance element, is interposed between the positive pole and the negative pole of the cell, outside the cell, whereby electrical current is caused to flow therebetween, through the resistance element, doing useful work. Eventually, a state is reached where the voltage-time curve of the secondary cell dips markedly to zero voltage, i.e., the derivative of cell voltage with time becomes increasingly negative. Alternatively, a minimum economical voltage may be reached, i.e., a voltage below which it becomes advisable to recharge cell, such as a voltage less than 90 percent or 80 percent or even 70 percent of full charge voltage.

The cell may be recharged by methods well-known in the art, for example, constant voltage recharging, constant current recharging, or ripple current recharging.

The following Examples are illustrative.

EXAMPLE I

A secondary cell was prepared having a zinc bromide electrolyte, a zinc anode collector, and a silicon cathode collector. A 2 normal zinc bromide solution was prepared and utilized as the electrolyte of the rechargeable bromine-zinc secondary cell.

A 12 centimeter by 1.9 centimeter by 0.9 centimeter silicon electrode was prepared from a silicon alloy ingot containing 8 weight percent iron and 0.3 weight percent boron, elemental basis, balance silicon. A ruthenium-dioxide-titanium dioxide surface was applied to the electrode. The surface was applied by preparing a solution of 1 gram of Englehard Industries ruthenium trichloride, $RuCl_3$—$3H_2O$, in 1 gram of U.S. Industrial Chemical Company absolute ethyl alcohol. After each coat, the electrode was heated to 350°C. for 15 minutes. Thereafter, three coats of an outer coating were applied atop the undercoating. The outer coating was prepared by dissolving 4.0 grams of K and K Laboratories, Inc. titanium chloride, $TiCl_3$, at 21.2 grams of a 15 weight percent aqueous solution of Fisher Scientific Company hydrochloric acid. This solution was then mixed with 2 grams of Mallinckrodt absolute methyl alcohol and 1.0 gram of Baker and Adams 30 weight percent hydrogen peroxide. This was then mixed with 2.4 grams of a liquid composition that had been prepared from 1 gram of Englehard Industries ruthenium trichloride, $RuCl_3$—$3H_2O$, and 4 grams of Mallinckrodt absolute methyl alcohol. Three coats of the resulting liquid composition were applied to the previously coated surface of the electrode. After each of the first two coats, the electrode was heated to 350°C. for ten minutes. After the last coat, the electrode was heated to 450°C. for 30 minutes.

The 12 centimeter by 1.9 centimeter by 0.9 centimeter silicon electrode prepared above, and a 12 centimeter by 1.9 centimeter by 0.9 centimeter graphite, separated by a 0.2 centimeter Teflon (TM) spacer were mounted on common plexiglass mounts. A 12.7 centimeter by 3.8 centimeter by 0.1 centimeter zinc electrode was placed parallel to the 12 centimeter by 1.9 centimeter spaces of the graphite and coated silicon electrodes, and spaced 0.6 centimeters therefrom.

The zinc electrode was connected through a variable resistor circuit to the graphite electrode and to the coated silicon electrode whereby the graphite electrode and the coated silicon electrode were in parallel to each other and in series with the zinc electrode. In this, the voltage drop between the zinc electrode and the graphite and coated silicon electrodes can be equal, or the current density on both the coated silicon electrode and the graphite electrode can be equal.

Two layers of liquid were then prepared. The bottom layer was prepared from 30 milliliters of bromine and sufficient carbon disulfide to provide 100 milliliters of solution. The top layer was a 2 normal solution of aqueous zinc bromide.

The electrode assembly described above was inserted in top layer, i.e., the 2 normal zinc bromide electrolyte, and the results shown in Table I were obtained.

Table I

| Current Density (Milliamperes per square centimeter) | Discharge Voltage Zinc/Coated Silicon Voltage (volts) | Zinc/Graphite Voltage (volts) |
|---|---|---|
| 3.28 | 1.639 | 1.611 |
| 4.37 | 1.619 | 1.582 |
| 6.56 | 1.572 | 1.529 |
| 8.74 | 1.509 | 1.471 |
| 13.12 | 1.420 | 1.371 |
| 17.48 | 1.345 | 1.272 |
| 21.86 | 1.269 | 1.159 |
| 26.24 | 1.181 | 1.034 |
| 30.61 | 1.111 | 0.936 |

Next, a six volt storage battery was connected between the lead from the zinc electrode and the common lead to the graphite and coated silicon electrodes. The results obtained on recharge are shown in Table II.

Table II

| Current Density (milliamperes per square centimeter) | Charge Voltage Zinc/Coated Silicon Voltage (volts) | Zinc/Graphite Voltage (volts) |
|---|---|---|
| 2.18 | 1.849 | 1.922 |
| 4.37 | 1.908 | 1.996 |
| 6.56 | 1.960 | 2.057 |
| 8.74 | 2.009 | 2.114 |
| 13.12 | 2.100 | 2.230 |
| 17.48 | 2.196 | 2.343 |
| 21.86 | 2.271 | 2.461 |
| 26.24 | 2.355 | 2.570 |
| 34.96 | 2.511 | 2.760 |

Both series of tests, i.e., discharge and charge, showed that the zinc bromine cell having a ruthenium dioxide coated silicon cathode had a lower charging voltage and a higher discharging voltage than a cell with a graphite cathode.

The results of both series of tests, i.e., discharge and recharge, are shown in FIGS. 1 and 2. FIG. 1 is the power in watts, i.e., volts times amperes, plotted against current, i.e., amperes, for the ruthenium oxide coated silicon cathode and the graphite cathode. At equal current, the ruthenium oxide coated cathode has a higher power output.

FIG. 2 shows the charge and discharge voltages versus current density, for the ruthenium dioxide coated silicon electrode and the graphite electrode. At equal current density, the ruthenium dioxide coated silicon cathode has a higher discharge voltage and a lower charge voltage.

EXAMPLE II

A secondary cell was prepared having a lithium anode collector, a LiAlCl$_4$ electrolyte, and a powdered silicon cathode collector.

An aqueous solution of one molar LiAlCl$_4$ was prepared from Technical Grade Sublimed AlCl$_3$ and Certified Grade LiCl. Potassium oxychloride, POCl$_3$ was added to this solution. This solution was then utilized as the electrolyte of a secondary cell having a lithium anode collector and a porous silicon cathode collector.

The lithium anode collector was a ½ inch (12.7 mm) diameter extruded rod. The cathode collector was prepared from finely powdered silicon. The silicon powder was mixed with 20 weight percent of DuPont TFE Dispersion 30 and sufficient water to attain a pasty consistency. This paste was applied to both sides of a nickel screen, pressed between steel plates at 10,000 pounds per square inch, and dried at 120°C. for 24 hours.

The anode collector, cathode collector, and electrolyte, with a 0.0027 inch (0.068 mm) thick Webril non-woven polypropylene separator, were then inserted in a cut-off 100 milliliter beaker as a cell. The cell was kept inside a battery box.

The cell potential was monitored by a Sargeant Model H strip chart recorder. The load resistors were contained in a General Radio Precision resistance box. The current was monitored by the voltage drop across the resistors using a Keithly Model 610C electrometer.

The open circuit voltage was 3.15 volts. The power density at maximum output was 25.2 watts per pound.

Although the present invention has been described with reference to specific details of particular embodiments thereof, it is not intended thereby to limit the scope of the invention except insofar as specific details are recited in the appended claims.

We claim:

1. In an electrochemical cell having an anode comprising a metal chosen from the group consisting of zinc, lithium, tin, iron, and magnesium, a non-consumable cathode, an electrolyte, and means for recovering an electrical current generated therein, the improvement wherein said cathode comprises:

a silicon metal substrate having an electroconductivity greater than 100 (ohm-cm)$^{-1}$; and
   an electroconductive surface other than said silicon metal on said substrate.

2. The electrochemical cell of claim 1 wherein said cell is a secondary cell.

3. The electrochemical cell of claim 1 wherein the silicon metal is in the form of an alloy silicon, dopants chosen from the group consisting of nitrogen, boron, phosphorous, aluminum, and mixtures thereof, and transition metals chosen from the group consisting of titanium, zirconium, hafnium, vanadium, columbium, tantalum, chromium, molybdenum, tungsten, manganese, iron, cobalt, nickel, copper, ruthenium, rhodium, palladium, osmium, iridium, platinum, gold, silver, and mixtures thereof.

4. The electrochemical cell of claim 1 wherein the metallic silicon contains sufficient dopant chosen from the group consisting of nitrogen, boron, phosphorous, and aluminum, and mixtures thereof to provide an electrical conductivity greater than 100 (ohm-cm)$^{-1}$.

5. The electrochemical cell of claim 2 wherein said electrolyte is an aqueous electrolyte.

6. The electrochemical cell of claim 5 wherein said aqueous electrolyte is acidic.

7. The electrochemical cell of claim 6 wherein said aqueous, acidic electrolyte comprises a zinc halide salt chosen from the group consisting of zinc chloride and zinc bromide and wherein said anode collector comprises zinc.

8. The electrochemical cell of claim 6 wherein said aqueous, acidic electrolyte comprises an oxyhalide chosen from the group consisting of POCl$_3$, SO$_2$Cl$_2$, and SOCl$_2$, and an alkali metal halide, and wherein the anode comprises the alkali metal.

9. The electrochemical cell of claim 8 wherein the alkali metal is lithium and the alkali metal halide salt is LiAlCl$_4$.

10. The electrochemical cell of claim 8 wherein the dopant content is from about 0.2 to about 2.0 weight percent, elemental basis, and the dopant is chosen from the group consisting of boron, phosphorous, and mixtures thereof; the transition metal content is less than 30 percent, elemental basis, and the transition metal is chosen from the group consisting of manganese, chromium, iron, cobalt, nickel, molybdenum, and mixtures thereof.

11. In a secondary electrochemical cell having an anode comprising a metal chosen from the group consisting of zinc, lithium, tin, iron, and magnesium, with a consumable metal surface thereon, a non-consumable metal cathode, and means for recovering an electrical current generated therein, the improvement wherein said cathode comprises a metallic silicon substrate having an electrical conductivity greater than 100 (ohm-cm)$^{-1}$, said silicon comprising:

a. from 0.2 to 2.0 weight percent dopant chosen from the group consisting of nitrogen, boron, phosphorous, aluminum, and mixtures thereof;
   b. less than about 30 weight percent of alloying agents chosen from the group consisting of titanium, zirconium, hafnium, vanadium, columbium, tantalum, chromium, molybdenum, tungsten, manganese, iron, cobalt, nickel, copper, ruthenium, rhodium, palladium, osmium, iridium, platinum, gold, silver, and mixtures thereof; and
   an electroconductive surface on said substrate other than silicon metal.

* * * * *

UNITED STATES PATENT AND TRADEMARK OFFICE
CERTIFICATE OF CORRECTION

PATENT NO. : 3,982,960
DATED : September 28, 1976
INVENTOR(S) : Howard H. Hoekje and Paul L. Dietz It is certified that error appears in the above-identified patent and that said Letters Patent are hereby corrected as shown below:

Column 9, line 52, between "alloy" and "silicon" please add --of--.

Signed and Sealed this

Fourteenth Day of December 1976

[SEAL]

Attest:

RUTH C. MASON
*Attesting Officer*

C. MARSHALL DANN
*Commissioner of Patents and Trademarks*